United States Patent

Chen et al.

[11] Patent Number: 5,903,281
[45] Date of Patent: *May 11, 1999

[54] LIST CONTROLLED VIDEO OPERATIONS

[75] Inventors: Jiann-tsuen Chen, Campbell; Alexandar G. MacInnis, San Carlos; Ken Morse, Foster City, all of Calif.

[73] Assignee: PowerTV, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/612,104

[22] Filed: Mar. 7, 1996

[51] Int. Cl.⁶ .................................................. G06F 9/38
[52] U.S. Cl. .................................................. 345/504
[58] Field of Search ........................... 395/118, 519–526; 345/121–122, 133, 418, 504, 522; 348/578

[56] References Cited

U.S. PATENT DOCUMENTS

| | | | |
|---|---|---|---|
| 4,797,852 | 1/1989 | Nanda | 345/123 |
| 5,167,016 | 11/1992 | Bagley et al. | 395/793 |
| 5,185,599 | 2/1993 | Doornink et al. | 345/200 |
| 5,227,863 | 7/1993 | Bilbrey et al. | 348/578 |
| 5,265,201 | 11/1993 | Cabot et al. | 345/504 |
| 5,265,203 | 11/1993 | Peaslee et al. | 395/502 |
| 5,321,806 | 6/1994 | Meinerth et al. | 345/522 |
| 5,353,403 | 10/1994 | Kohiyama et al. | 395/516 |
| 5,367,680 | 11/1994 | Flurry et al. | 395/677 |
| 5,448,301 | 9/1995 | Michener | 345/133 X |
| 5,504,917 | 4/1996 | Austin | 345/522 |
| 5,581,766 | 12/1996 | Spurlock | 395/652 |
| 5,592,622 | 1/1997 | Isfeld et al. | 395/200.37 |
| 5,632,030 | 5/1997 | Takano et al. | 345/522 |
| 5,678,036 | 10/1997 | Lin et al. | 345/522 |
| 5,745,761 | 4/1998 | Celi, Jr. et al. | 345/522 |
| 5,790,134 | 8/1998 | Lentz | 345/522 X |
| 5,798,762 | 8/1998 | Sfarti et al. | 345/522 X |
| 5,812,150 | 9/1998 | Lum | 345/522 |

OTHER PUBLICATIONS

Berson, Client/Server Architecture, 1992, pp. 44–48, 1992.

Ellsworth et al., Distributing a Play List on a Multicomputer, Computer Graphics, pp. 147–154, Mar. 1990.

Azim et al., A Low Cost Application Specific Video Codec for Consumer Video Phone, 1994 Custom Integrated Circuit Conference, pp. 6.7.1–6.7.4, May 1, 1994.

Franssen et al., Control Flow Optimization for Fast System Simulation and Storage Minimization, European Design Automation Conference, pp. 20–24, Feb. 28, 1994.

Davidson et al., Generality—A Low Cost Approach to Digital Image Processing, IEE Colloq No. 141: Application Specific Integrated Circuits, pp. 9/1–9/4, Jun. 7, 1993.

Graphics Controller Implements Bit Block Transfer: by David Simmons, Bob Berger, and Gary Downing, Electronic Imaging, Jun. 1984.

"Process Images Fast With A Real–Time OS", by Steve Butterfield, Electronic Design, Apr. 18, 1994.

*Primary Examiner*—Anton Fetting
*Attorney, Agent, or Firm*—Harness, Dickey & Pierce P.L.C.

[57] ABSTRACT

An improved graphical manipulation technique for a home communication terminal (HCT) includes a linked-list of commands controlling various video operations in an application specific integrated circuit (ASIC). After each command has been implemented by the ASIC, the ASIC proceeds to the next command without interrupting a host processor. Accordingly, the linked-list eliminates the need of the host processor to continually process interrupts at the completion of each instruction. The linked-list command structure aids in intensive video operations including bit block transfers, video capture, and video display.

22 Claims, 9 Drawing Sheets

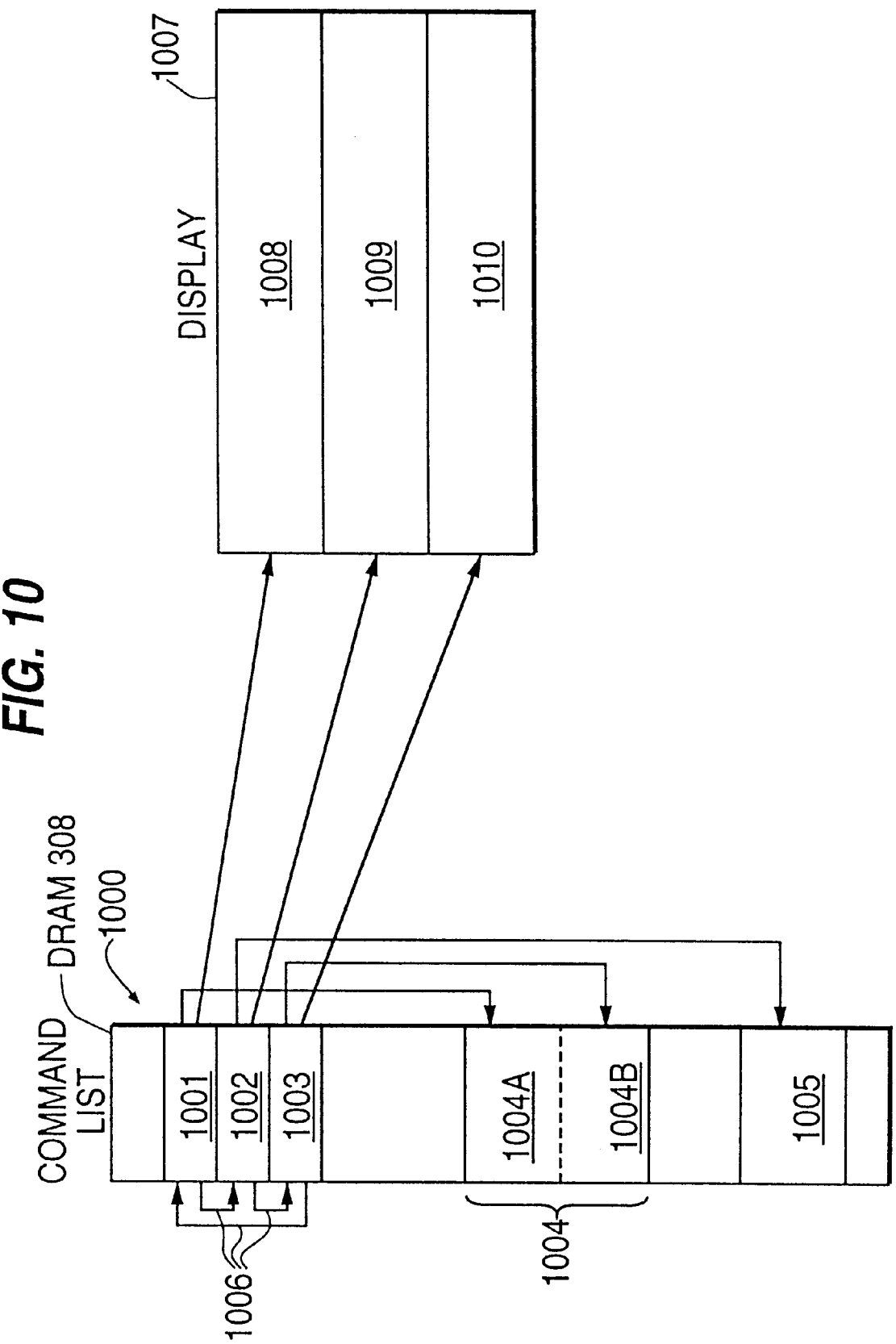

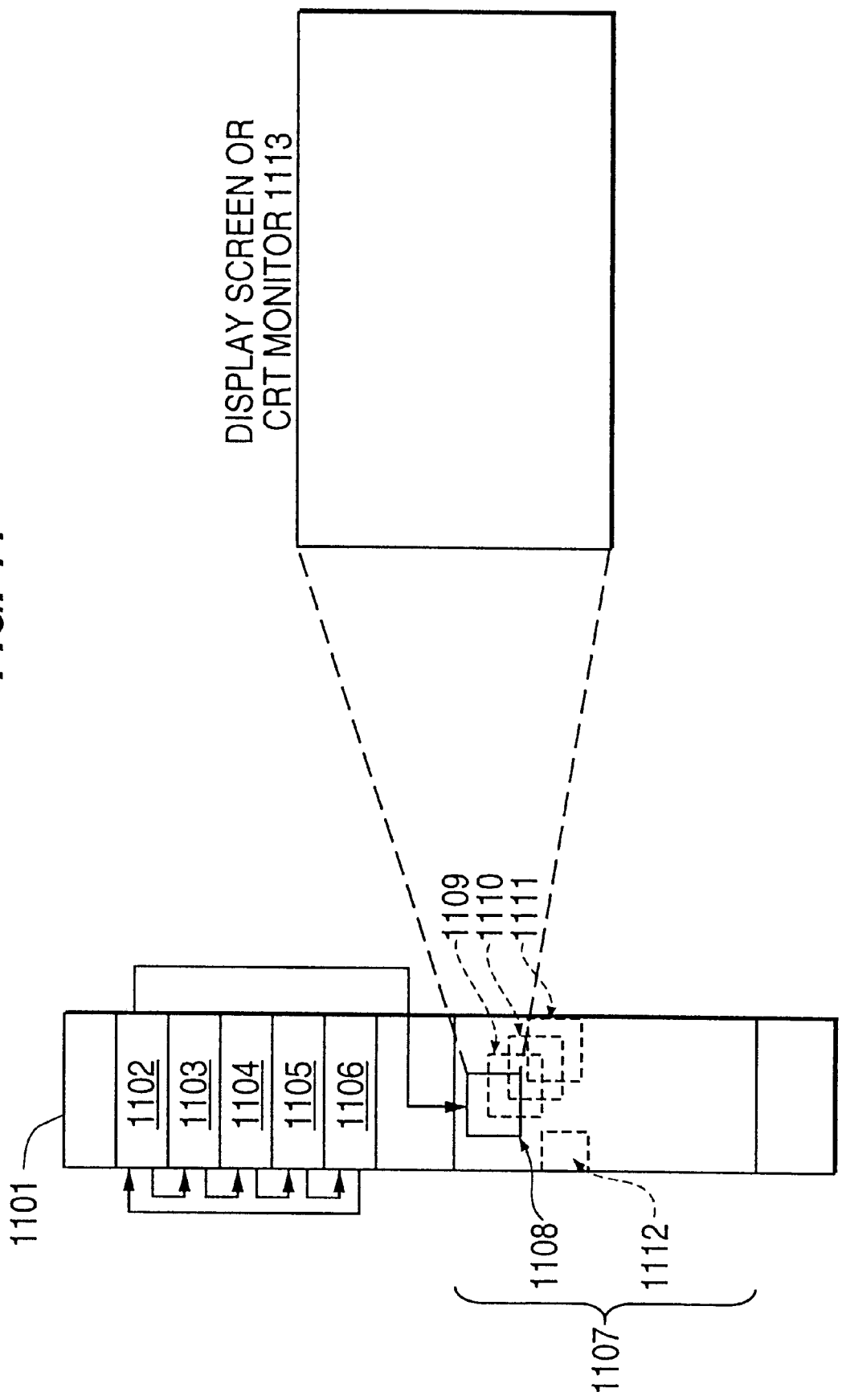

LIST CONTROLLED VIDEO OPERATIONS

RELATED APPLICATIONS

This disclosure is related to the following disclosures filed concurrently herewith: Blending of Video Images in a Home Communications Terminal, Serial No. ; and, Interpolation of Pixel Values and Alpha Values in a Computer Display Device, Serial No.

BACKGROUND OF THE INVENTION

1. Technical Field

This invention relates generally to graphical processing in real-time operating systems adapted for high performance applications, such as those executing in a home communications terminal (HCT) to provide cable television or other audiovisual capabilities. More particularly, the invention provides a feature which improves the performance of operating systems installed in devices having limited computing resources.

2. Related Information

Conventional operating systems for HCTs, such as those in cable television systems, have typically provided limited capabilities tailored to controlling hardware devices and allowing a user to step through limited menus and displays. As growth in the cable television industry has fostered new capabilities including interactive video games, video-on-demand, downloadable applications, higher performance graphics, multimedia applications and the like, there has evolved a need to provide operating systems for HCTs which can support these new applications. Additionally, newer generations of fiber-based networks have vastly increased the data bandwidths which can be transferred to and from individual homes, allowing entirely new uses—such as telephony—to be developed for the HCTs. As a result, conventional HCTs and their operating systems are quickly becoming obsolete. In short, HCTs need to evolve to transform today's consumer television sets into interactive multimedia entertainment and communication systems.

Conventional display systems in HCTs include a host processor coupled to a video display device. Faster host processors generally provide faster display manipulations. However, with the advent of higher resolution screens, the amount of display information that needs to be processed also increases. Accordingly, merely increasing the host processor throughput may not be an optimal solution for increasing display performance.

Moreover, merely adding additional processors and memory to an HCT design may unacceptably increase its cost. Accordingly, it is desirable to find ways of increasing display performance within the framework of a low-cost design.

Conventional graphics systems allow groups of pixels to be moved in display memories in a single operation. The movement of at least two pixels together is commonly referred to in the art as bit block transferring (or BitBLT). Using a BitBLT, a CPU can select a block (most often, a rectangular block) of pixels, provide source and destination starting addresses, and invoke a hardware-supported function to perform the transfer. However, where multiple groups of pixels must be moved, the CPU is unnecessarily interrupted to start a new transfer and to update the source and destination addresses for the transfers.

Another inefficiency in conventional video display systems concerns the performance of a video capture function. For such a function, portions of a first memory area are repeatedly copied to a second area for display. As with conventional BitBLT operations, constantly interrupting a CPU to coordinate this function robs performance from the CPU.

In short, conventional video display systems such as those in an HCT suffer from performance inefficiencies which hinders their use for new applications.

SUMMARY OF THE INVENTION

In order to overcome the aforementioned problems, according to one aspect of the present invention, a graphical system is controlled by a list of operating commands stored in memory, wherein it is not necessary to interrupt the CPU between execution of each command. In the preferred embodiment, each command is linked to the next command to be implemented.

According to another aspect of the invention, the list of commands controls a BitBLT engine in an Application-Specific Integrated Circuit (ASIC).

According to another aspect of the invention, the list of commands controls the capture of an input video image.

According to another aspect of the invention, the list of commands controls the display of a video image.

Other features and advantages will become evident through the following detailed description, figures and claims.

BRIEF DESCRIPTION OF THE DRAWINGS

FIGS. 10 and 11 show video display functions employing various principles of the present invention.

DETAILED DESCRIPTION

Figure 1:
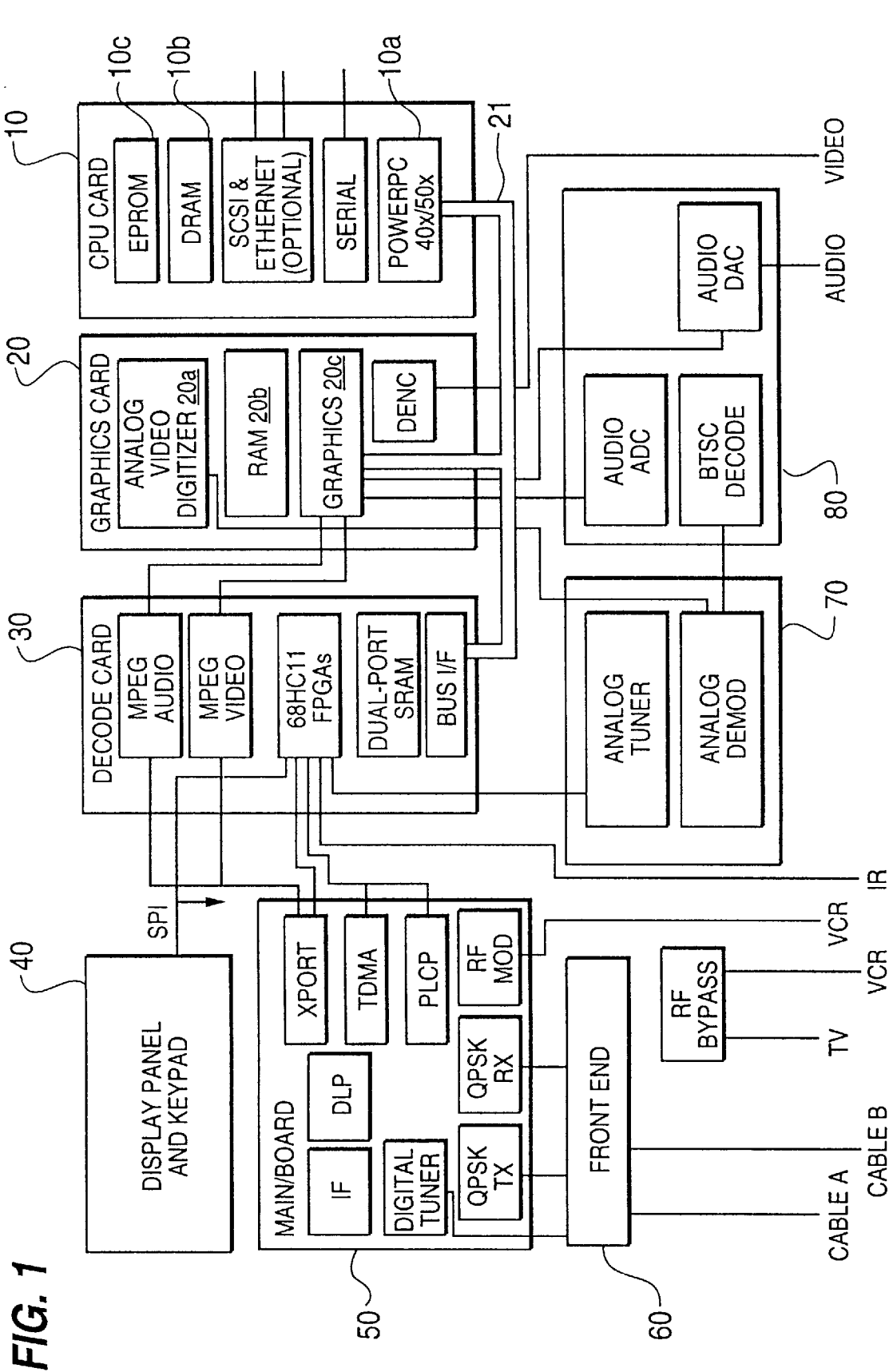
FIG. 1 shows one possible configuration for a home communication terminal (HCT) on which an operating system employing the principles of the present invention can be installed.

FIG. 1 shows a block diagram of a home communication terminal (HCT) in which various principles of the present invention may be practiced. The HCT may include a CPU card 10, graphics card 20, decoder card 30, display panel and key pad 40, main processing board 50, front end 60, tuning section 70, and audio section 80. It is contemplated that the inventive principles may be practiced using a CPU 10a such as a PowerPC or Motorola 68000 series, with suitable EPROM 10c and RAM 10b. It is also contemplated that application programs executing on CPU 10a can interact with various peripherals such as a mouse, game controllers, keypads, network interfaces, and the like, as is well known in the art.

Graphics card 20 preferably includes an analog video digitizer 20a, RAM 20b, graphics chip 20c, and DENC 20d.

Figure 2:
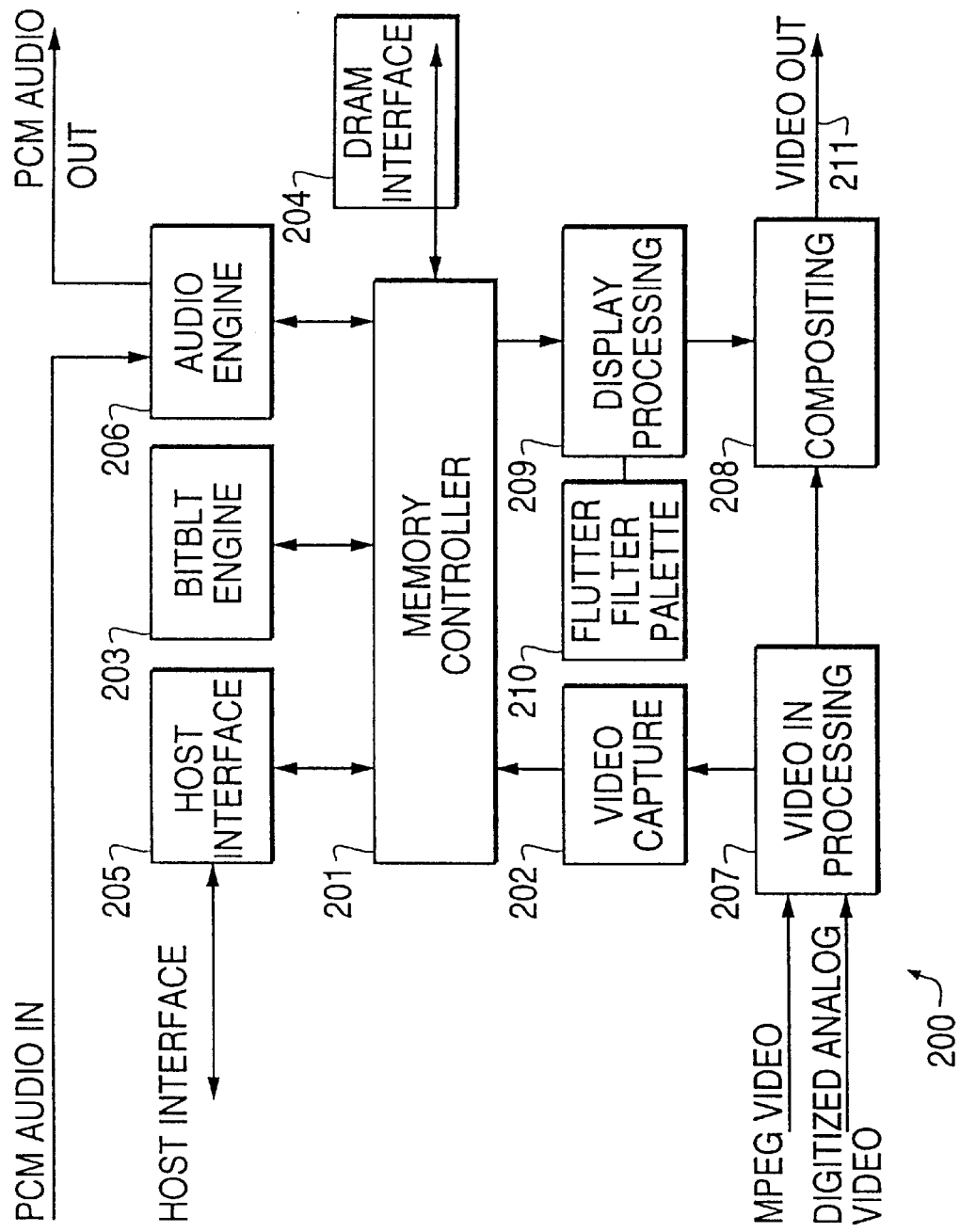
FIG. 2 shows an ASIC employing various principles of the present invention.

The graphics chips is preferably an ASIC (application specific integrated circuit). RAM 20b is preferably a DRAM. Analog video digitizer 20a converts analog video to digital video for use by graphics chip 20c. Bus 21 connects graphics card 20 to CPU card 10 and decoder card 30. Graphics chip 20c coordinates the interactions between the components of graphics card and CPU card 10 and decoder card 30. FIG. 2, described below, describes in greater detail graphic chip 20c and its components.

One method of increasing the speed of a computing system is to perform certain functions of the system in specifically enhanced devices. For example, an ASIC or other graphics processor may be used to implement various graphical commands in an enhanced fashion. While an ASIC may implement commands, however, it does not necessarily include the branching steps most commonly found in a processor.

As shown in FIG. 2, the present invention contemplates the use of an ASIC 200 comprising a memory controller 201, a video capture engine 202, a BitBLT engine 203 and an interface 204 to a dynamic random access memory (DRAM). Additionally, the ASIC preferably includes an interface 205 to the host processor (corresponding to CPU 10a in FIG. 1), an audio engine 206, a video processing engine 207 which receives MPEG video and digitized analog video and outputs signals to the video capture system 202 and a compositing system 208. Finally, the ASIC preferably includes a display processing section 209 connected between a flutter filter/palette 210 and compositing circuit 208, which outputs a video signal 211.

Command List

Figure 3:
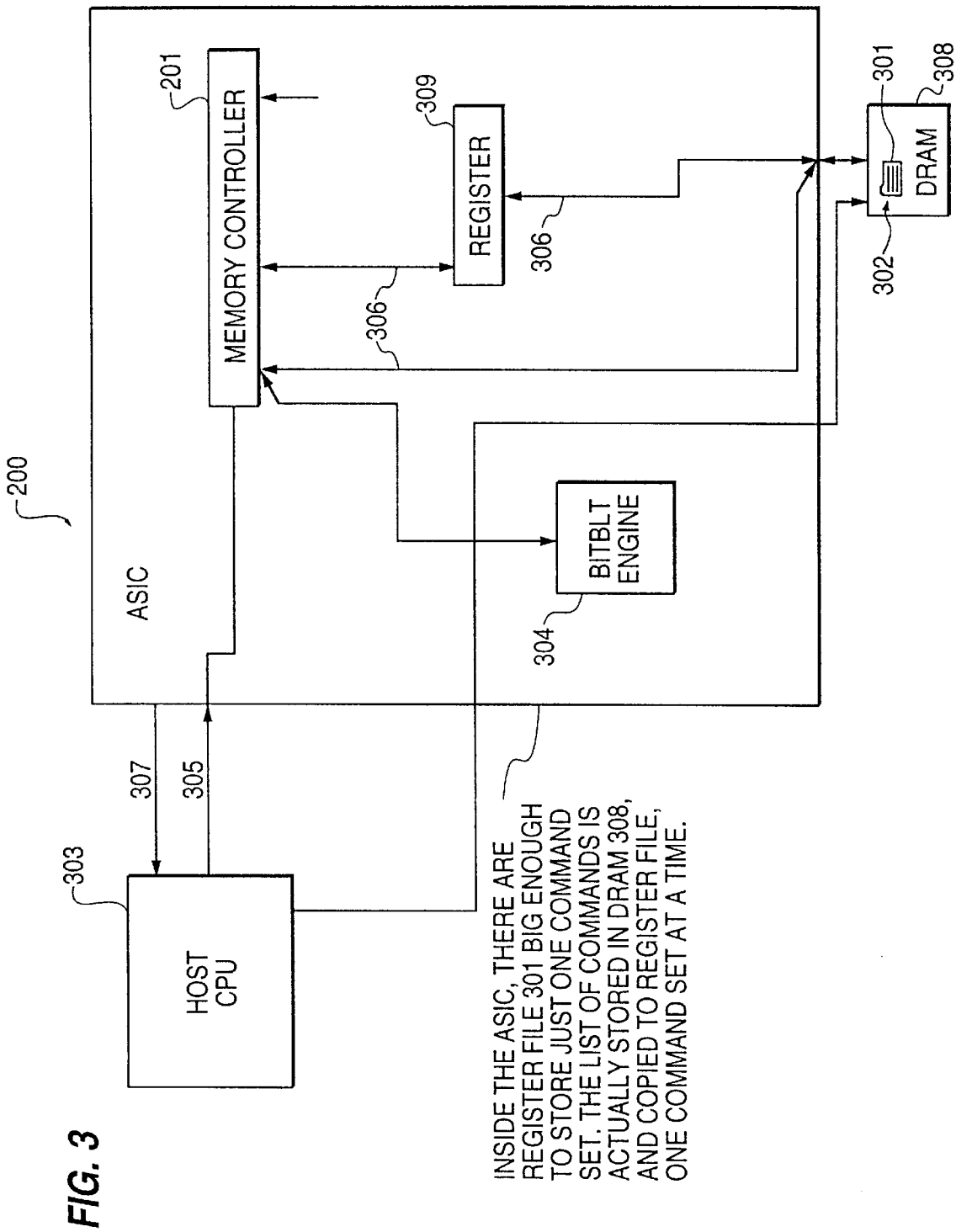
FIG. 3 shows the ASIC with a linked list.

Referring to FIG. 3, ASIC 200 may comprise a register 309 which stores a single command loaded from command list 301. Preferably located in DRAM 308, command list 301 holds commands 302 from host CPU 303. The type of memory used is preferably a DRAM, although SRAMS and other memories could be used. Host CPU 303 is preferably an IBM or Motorola PowerPC or a Motorola 68000 processor. Command list 301 may contain commands including graphical drawing or rendering commands, BitBLT commands, adding commands, and deleting commands, for example. In accordance with one aspect of the invention, host CPU 303 stores a first list of commands (to be sequentially executed) in command list 301 in DRAM 308. After host CPU 303 writes the list of commands into command list 301 (see step 304), host processor 303 commands (step 305) ASIC 200 to retrieve into register 309 and implement the commands 302 stored in the list 301 (step 306). In response, ASIC 200 implements each command as it is loaded from DRAM 308. Finally, if and when one of the commands in the list signals the end of the command list, ASIC 200 informs host CPU 303 that the execution of the command list has been completed (step 307).

One use of the list of commands is to provide a sequence of BitBLT commands which can be executed without interrupting host CPU 303. As described previously, a conventional BitBLT function copies a rectangular array of pixels from one set of memory locations to another. The following description of the command list relates to the BitBLT operation. Other applications of the command list follow.

Referring to FIG. 3, host CPU 303 builds a command list 301 in DRAM 308. By storing these commands in DRAM 308 which is latter accessed by ASIC 200, the host 303 is relieved from later having to process numerous flags from the ASIC at the end of each BitBLT operation. An example of list 301 is shown in FIG. 4.

Figure 4:
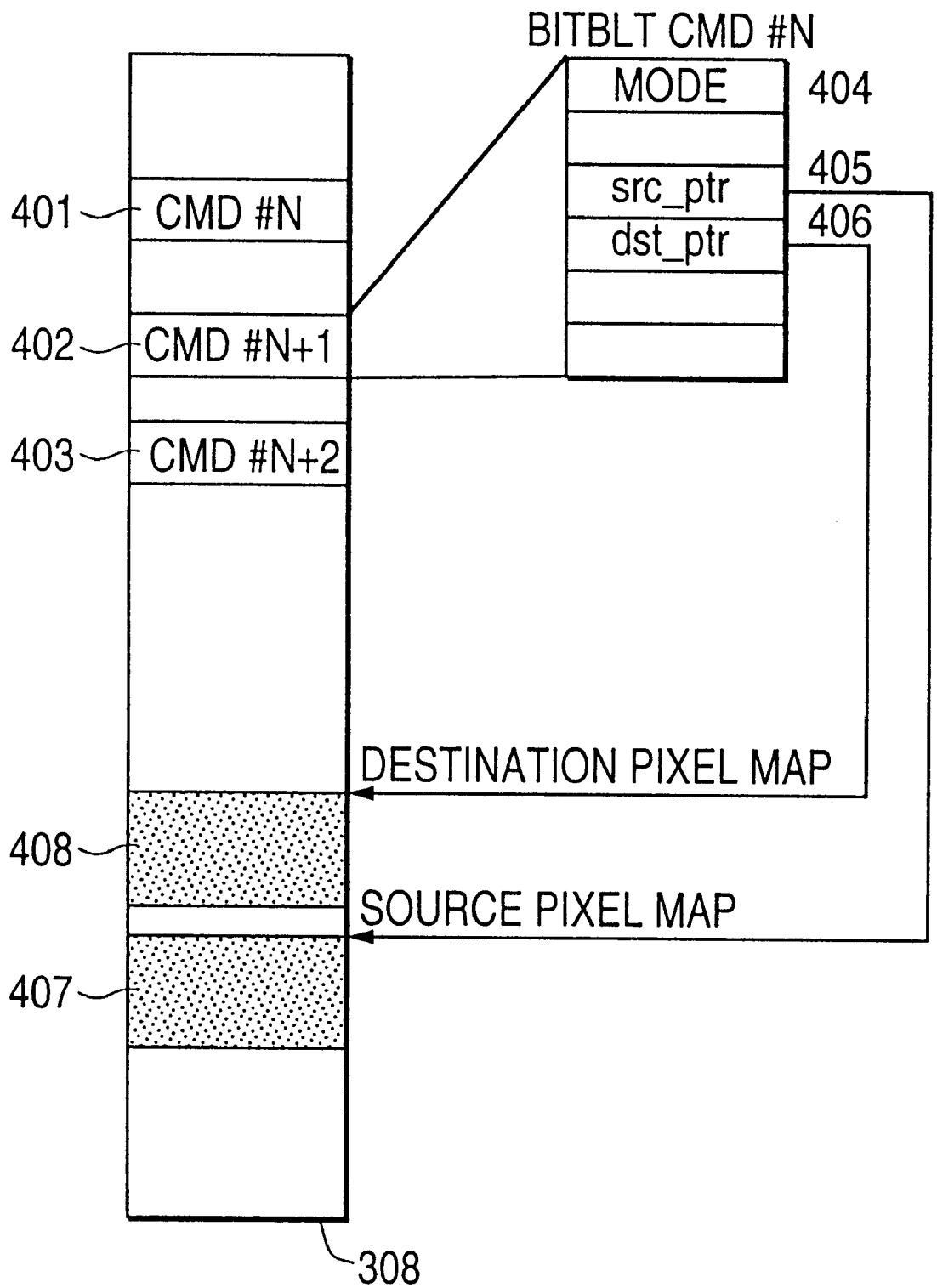
FIG. 4 shows a linked list of the present invention.

FIG. 4 depicts a list of commands in an execution sequence. Command N is followed by Command N+1 402 which is followed by Command N+2 403. Each command may include a set of command parameters. As shown in FIG. 4, these parameters may include "mode" 404, "src_ptr" 405, and "dst_ptr" 406. Other entries may also be included but are not shown in FIG. 4 for the sake of clarity.

"Mode" entry 404 defines the type of operation to be performed. With respect to BitBLT operations "mode" entry 404 may include an indicator specifying whether the BitBLT operation should include pure copying, copying with chroma keying, or copying with alpha value blending. Chroma keying is a process of checking a source pixel for transparency and conditionally replacing the destination pixel with the source pixel if the source pixel is not transparent. Alpha blending is a process of reading source and destination pixel arrays, blending the two pixel arrays on a pixel-by-pixel basis based on a weighted "alpha" value, and writing the resulting array to the destination address (replacing the destination array). An alpha value or blending factor relates to the weight assigned to one of the images combined with another in a blending process.

"Src_ptr" 405 is a source pointer which designates the location in the DRAM 308 of the source pixel map 407. "Dst_ptr" is a destination pointer which designates the location in the DRAM 308 of the destination pixel map 408.

When the host desires to update command list 301 in DRAM 308, at least a portion of the list needs to be rewritten. If exactly one command needs to be replaced with another command, then the host may simply rewrite that portion of memory. However, if one or more commands need to be replaced by a different number of commands, then the remaining list of commands needs to be rewritten from the command to be replaced and all subsequent commands.

Figure 5:
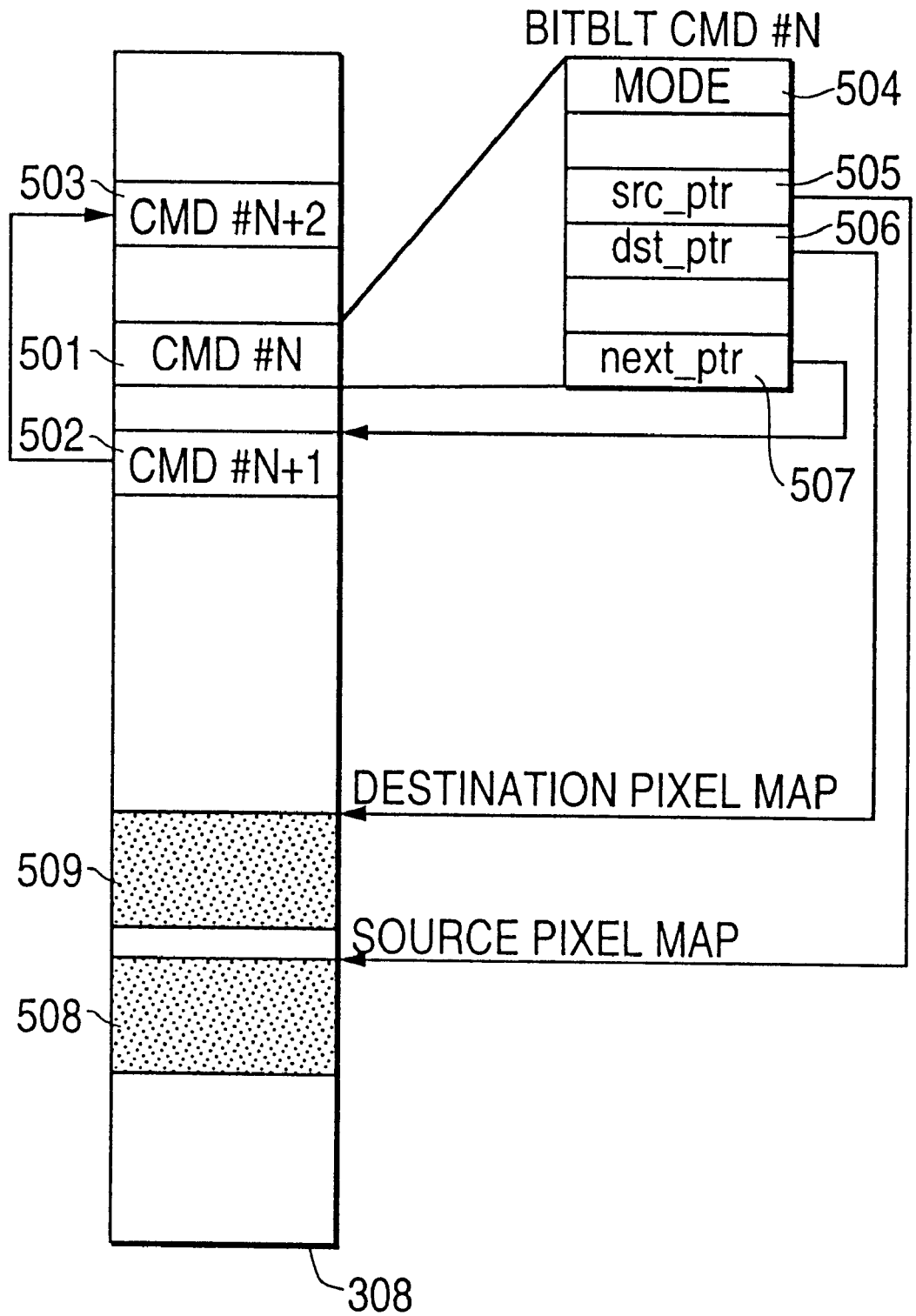
FIG. 5 shows an alternative embodiment of the linked list of the present invention.

The command list as stored in DRAM 308 may be stored as a linked list, wherein each stored command includes a pointer to another command which follows it. The linked list structure easily accommodates updates. For example, FIG. 5 depicts the DRAM 308 after having been programmed by host CPU 303. The order of the commands as physically stored in the memory is Command# N+2 (503), Command# N (501), and Command# N+1 (502). As with the sequential list structure, each command includes numerous entries including "mode" 504, "src_ptr" 505, and "dst_ptr" 506. Additionally, other entries may exist. Finally, each command in the linked-list command list contains an entry "next_ptr" 507, which points to the address of the next command. In the case of a BitBLT operation the "next_ptr" 507 points to the next BitBLT command.

When host CPU 303 modifies the linked list command structure, it need not rewrite significant portions of memory as described above. Rather, it need only modify a minimal portion of the memory to include the new commands and modify the "next_ptr" 507 of the preceding command. In the case of deleting a selected command, the "next_ptr" 507 need only be modified to skip the selected command and point to the command following the selected command. These modifications include changing the order of how the objects are drawn, or adding or deleting particular objects.

Figure 6:
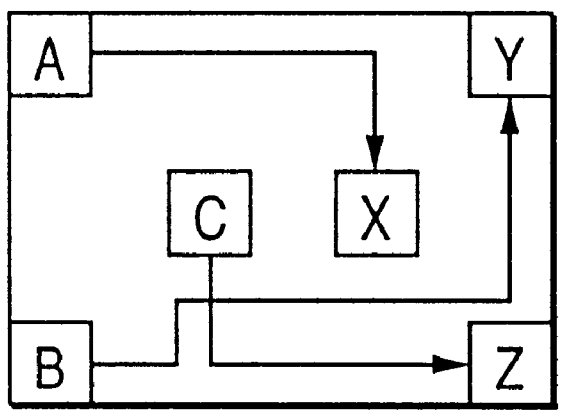
FIG. 6 shows three bit block transfer operations.

FIG. 6 depicts a generic example of moving a plurality of pixel blocks in a single operation. FIG. 6 shows blocks of pixels A, B, and C. In order to move these blocks to locations X, Y, and Z, respectively, the host writes these commands (move-A-to-X, move-B-to-Y, move-C-to-Z) into the DRAM 308, then commands the ASIC to begin executing the list of commands. Where a single iteration of the sequence of commands is desired, the last command in the list of BitBLT commands may comprise a command to indicate to the host that the BitBLT operation is complete. This command is an enabling interrupt sent after the completion of the BitBLT operation. Once notified, the host CPU 303 may modify the command list. This modification may occur at any time. However, there is a risk of modifying the command list as the ASIC is reading it.

Figure 7:
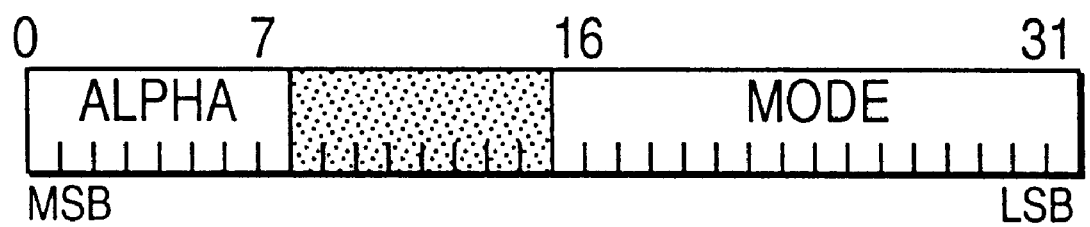
FIG. 7 shows a register in the ASIC which receives the various commands from the list of commands.

Another aspect of the present invention contemplates using a portion of the "mode" entry for parameters other than the command in the linked list. FIG. 7 shows a preferable embodiment of the mode register. In this case, when the ASIC reads the mode command, it loads it into the register of FIG. 7. From there the ASIC determines which graphical functions the ASIC should perform. Here, an alpha value (the value used to blend two pixel values) occupies the first 8 bits. The alpha value designation is not a necessary component of the "mode" entry as the alpha value may be added in through another register. The last 16 bits of the register contain a description of the specific operation to be performed. The setting of these bits may inform a BitBLT engine 203 to wait for special events to occur. The occurrence of these special events is determined either internal or external to the ASIC as depending on the special event. These events include waiting for the start of each display field, waiting for the end of a field display, waiting for the completion of video capture of an odd, even, or either video field, waiting for CRTC raster compare events, waiting for audio events, waiting for timer events, and waiting for host events. The command is executed preferably after the wait events are all satisfied. In some cases, not all events need to be satisfied. In particular, waiting-for-host events may not require all other events to be satisfied before restarting the BitBLT engine. Preferably, all of these modes are implemented by setting one of the appropriate bits in the mode field of this register.

The mode register may further include a suspend indicator which halts the implementation of the commands from the linked-list until the host commands BitBLT engine 203 to resume operation. To implement a suspend operation, ASIC 200 generates an interrupt and sends it to host CPU 303. For example, if the next operation to properly construct a display memory was to scale a pixel map to another size, something ASIC 200 might not be able to perform, ASIC 200 would have to wait until host CPU 303 performed the desired function before it could continue. Scaling is used as an example because generally no preset scaling ratio is set. Thus, scaling operations are preferably handled in software, running in host CPU 303.

ASIC circuits can operate at speeds which far exceed the ability of host CPU 303 to keep up. A user would want to harness this speed of an ASIC (in this case, a BitBLT engine) without degrading the quality of a resulting image. Accordingly, ASIC circuits need to be regulated to prevent unwanted distortions resulting from this speed difference. In this regard, these modes which require the BitBLT engine to wait for special events perform flow control on the BitBLT engine. This flow control ability of the linked list aids in animation, lip syncing, and in the prevention of tearing, as described below.

Animation is the art of moving a rendered character about a display. Without flow control, a BitBLT engine operating at high speeds on a list of instructions could distort the rendered character, making it appear to jump across a display, if not only move very quickly. The reason for the accelerated motion of the rendered animation is that the BitBLT runs faster than the refresh rate of the display. For example, if an animated character were to slowly walk across a screen, a BitBLT engine quickly processing a list of instructions without flow control would cause the character to jump from position to position. This would be caused by the BitBLT engine processing multiple movements of the character in the space of one refresh of the display. Accordingly, the flow control mode of, for example, waiting until the end of a display field would cause the BitBLT engine to wait until the character has been rendered before starting to change the memory in which the character is stored.

Another area where flow control improves the operation of a list-directed BitBLT engine is in lip syncing. Lip syncing is the coordination of an audio track with a displayed image. For example, when a person is speaking, one expects the audio track to coincide with the image of the person's mouth. If a BitBLT engine were to run freely during the coordination of these audio and visual presentations, the viewer would notice the disturbing presentation of the person's mouth moving much faster than the words coming out of it. In this regard, a relevant operating mode would require the BitBLT engine to wait until the appropriate time in coordination with the audio data stream.

Figure 8:
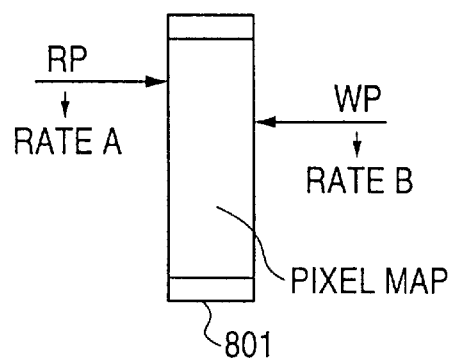
FIG. 8 shows read and write pointers operating on pixel memory during a BitBLT operation.

A third area where flow control improves the operation of the display is through the prevention of tearing. Tearing arises when a memory is read by an output device and simultaneously written to by a BitBLT engine (or other writing device). FIG. 8 represents a memory containing display data with a read pointer RP and a write pointer WP. The read pointer RP reads the memory at the designated location and outputs the read data to an output device (display, display buffer, video tape, etc.). The write pointer writes to the memory at the designated memory location as controlled by the BitBLT engine. Each of the two pointers moves through the display memory at its own rate. This is represented in FIG. 8 as the read pointer reading the memory at rate A and as the write pointer writing to the memory at rate B. If the two rates are equivalent (A=B), then the two pointers will never cross. If, however, the rates are different, then one pointer will be overtaken by the other pointer. If half of a first image stored in memory has been displayed when the write pointer passes the read pointer (overwriting the first image with a second image), the first half of the display screen will contain the first image and the second half of the display screen will contain the second image. The effect of this dual display is that the image appears "torn". This is readily seen in moving images where the "tearing" effect is exaggerated.

Application of the Linked List to Video Capture

Another application of the list of graphical commands is in video capture. Similar to the command structure of the BitBLT commands, the video capture command structure uses a mode register, a data buffer address, a storage address, and a next command pointer. As to the mode register, each command may specify a type of mode for each frame (RGB or YUV) or other control variables including the size of the frame or a factor indicating by how much the captured image should be scaled (scaling factor). If none is specified, then a default mode specification is used. The list is preferably written before the beginning of the video capture operation but may be updated after each frame capture.

Figure 9:
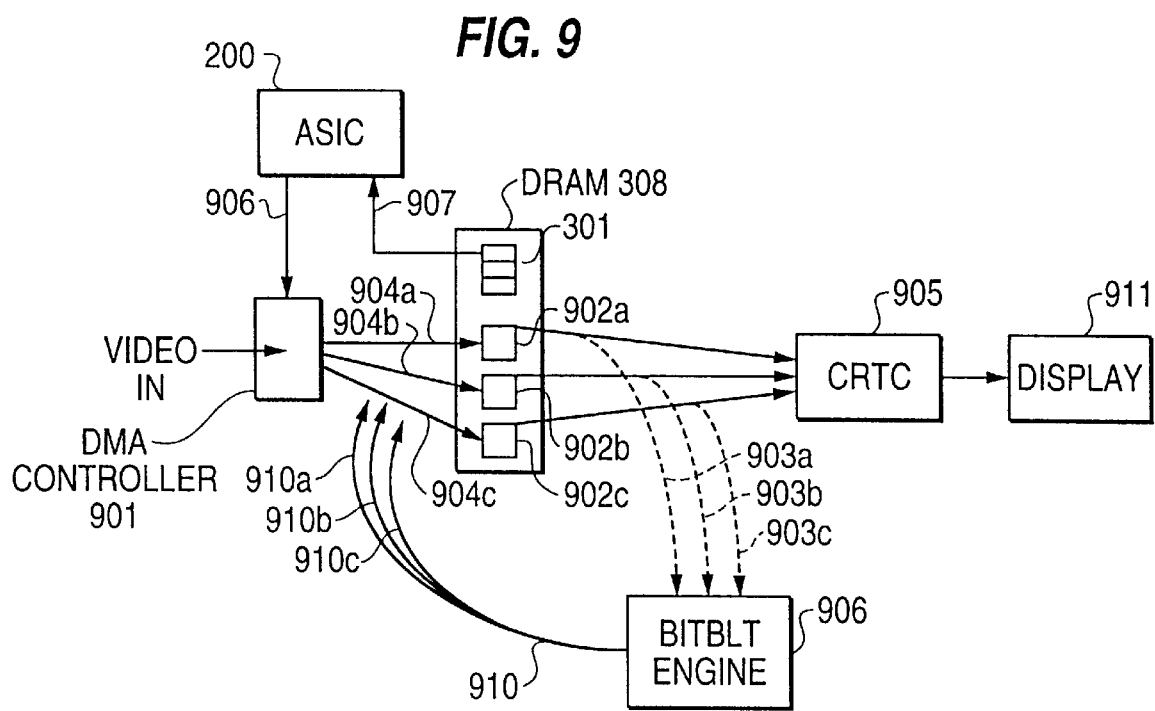
FIG. 9 shows a video capture operation employing various principles of the present invention.

FIG. 9 shows an video being captured. DRAM 308 includes the list of commands 301 which are read out by ASIC 200 (step 907). Each command directs ASIC 200 where the DMA controller 901 should place the received video. Each command may include the pitch of the received video frame, the location of where the frame should be stored in DRAM 308, and a pointer pointing to the next command. For example, the first command from the list 301 directs the DMA controller 901 to store a first received video frame in memory location 902a (through storing step 904a). The next command in the list 301 directs the DMA controller 901 to store the second received video frame in memory location 902b (through storing step 904b). The third command in the list 301 directs the DMA controller 901 to store the third received video frame in memory location 902c (storing step 904c). The list of commands continues until all of the designated video storage locations have been written. The pointer in the last command points back to the first command to start the writing sequence again. Using this repetitive overwriting scheme, the video capture is guaranteed to capture the most current data. In one embodiment, by using three memory locations store three video frames, the chance of "tearing" one screen is reduced. Here, one memory location may be written to while a second is being read out for display on display 911 while a third acts as a timing buffer between the other two. Additionally, the third buffer may be operated on by BitBLT engine 906.

As indicated above, the contents of the memory portions 902a, 902b, and 902c may be immediately displayed or be operated on by BitBLT engine 906. BitBLT engine 906 responds to the output of ASIC 200 as controlled by a different list of commands 301 in DRAM 308. In this instance, the BitBLT commands, stored in DRAM 301, may perform flow control operations. As the video capture operation occurs in real-time, the DMA controller 901 must continually update the memory portions 902a, 902b, 902c. As the BitBLT engine 906 may operate faster then rate at which the video is being received (or written into memory 308), BitBLT engine 906 must perform flow control to prevent operating on a memory location which is currently be written. As shown in FIG. 9, BitBLT engine 906 receives the memory portions 902a, 902b, and 902c through paths 903a, 903b, and 903c, respectively. After performing a blitter operation on the respective pixel maps, BitBLT engine 906 rewrites each of these memory portions through writing paths 910a, 910b, and 910c, respectively.

Application of the Linked List to Video Display

A third application of the linked-list is to perform a video display update operation with the linked-list controlling a CRTC. The term CRTC originally referred to a cathode ray tube controller. Presently, a CRTC refers to any controller which controls a display. The problem with using CRTC 905 alone as controlled by a CPU or host to continually update a video display 911 is that a display update is a laborious operation. In this regard, a CRTC would need to constantly re-address each and every pixel. In the case of a graphic ASIC, the ASIC alone would still need to alert the CRTC every time it completed an instruction. The application of the linked-list of instructions to the video display relieves the CRTC from constantly taking care of interrupts.

Each command includes a pitch and height, image starting address, alpha plane starting address, and a next command pointer. Additional fields may include a mode field, an alpha blending value, and a chroma key. The mode field describes the video display mode (RGB, CLUT, YUV). By specifying a blending value (or weight) for every command, each displayed portion of a pixel map may have a different blending value. The same applies for the chroma key.

The linked-list command structure aids in at least two types of display operations. The first type of display is the split screen display. FIG. 10 shows a split screen display with the ASIC memory 1000 containing two video pixel maps 1004 and 1005 and corresponding list of commands 1001, 1002, and 1003. A display 1007 is used to drive a display such as a CRT. The host writes video display commands 1001 through 1003 into memory. The commands are linked together as shown by the linking pointers 1006. For this example, pixel maps 1004 and 1005 include maps from two different video sources: the first map 1004, with portions 1004A and 1004B, and the second map 1005. The list of commands 1001, 1002, and 1003 may read out a single pixel map and output it to a display 1007. However, a more complex arrangement is shown. The following example shows how the second pixel map 1005 may be inserted in between sections 1004A and 1004B of a first pixel map 1004. In this case, the list of commands includes commands 1001, 1002, and 1003 with command 1003 linked back to command 1001 (as shown by pointers 1006). In this example, command 1001 reads out portion 1004A from the memory 1000 and displays it at portion 1007a of display 1007. The last pointer in command 1001 points to the next command 1002, which displays the second pixel map 1005 at portion 1007b of the display 1007. The last pointer in command 1002 points to command 1003, which displays the remaining portion 1004B of the first pixel map 1004 at portion 1007c of the display 1007. Finally, the last pointer in command 1003 points back to command 1001.

In a combined example, the ASIC may be performing a video capture of received video signals and storing the results to either or both of the first and second pixel maps 1004 and 1005 of DRAM 308. In a blitter operation operating on these memory portions, the mode of command 1001 might require the BitBLT engine to wait until both of pixel map 1004 and pixel map 1005 have been rewritten. Finally, when complete, a video display command may direct the pixel maps as stored in memory portions 1004 and 1005 to be displayed on display 1007. In this case, the ASIC memory may contain both linked lists at different locations, one for the video capture and one for the video display.

Further, the BitBLT engine may be performing a BitBLT operation on the pixel maps 1004 and 1005 as well. In this regard, ASIC memory 1000 would contain three linked lists of instructions, each operating separately under the control of the ASIC.

A second type of video display operation involves panning from one portion of a pixel map to another portion. FIG. 11 shows an ASIC memory 1101 with video display commands 1102 through 1106 linked together via their next_ptr pointers. The last command 1106 points back to command 1106 so that the display does not continuously re-pan across a pixel map but, rather, continues to display where the panning stopped. The memory 1101 also contains at least one pixel map 1107. In this example, the pixel map contains more information than is viewable in display or CRT monitor 1113. Accordingly, only a portion of the pixel map 1107 is displayed at any given time. For example, command 1102 reads portion 1108 of pixel map 1107 and map to display screen 1113. If command 1102 looped back to itself, then portion 1108 would be continually displayed until command 1102 or pixel map portion 1108 were rewritten.

In this example, command 1102 points to command 1103. Command 1103 maps pixel map portion 1109 to display screen 1113. Similarly, command 1104 maps pixel map portion 1110 to display screen 1113. This continues for the remaining portions 1111 and 1112 of pixel map 1107. In this case, the display commands control a window which selectively views a portion of pixel map 1107. As the window moves about the pixel map 1107, a different portion of the pixel map 1107 is mapped to screen 1113. In this example, the relative movement of the window is shown by arrow 1115. However, as the movement of the window is controlled by the commands, the window can pan or scroll in any direction as directed by the linked-list of commands. Finally, when host CPU 303 so decides, the list of commands may be rewritten to scroll or pan in a different direction or the pixel map may be rewritten to include a new pixel map. Alternatively, both the list of commands and the pixel map may be rewritten as determined by the host.

An example of an application which can use this scrolling are games that require a scrolling background. As a game player moves a character about a display, the host rewrites the list of commands to follow the movements of the rendered character. This scrolling technique may be further combined with the other display function of displaying split screens. If each portion of the display 1113 shows a different scene (or portion) of a pixel map, then the display can independently render the scene's character's respective movements (BitBLT function) over a moving background (scrolling function).

It is apparent that many modifications and variations of the present invention are possible, and references to specific values are by example only. For example, although an ASIC may be used to perform linked graphics functions in accordance with the invention, the inventive principles can be applied using other types of devices. It is, therefore, to be understood that within the scope of the appended claims the invention may be practiced otherwise than as specifically described.

We claim:

1. A method of processing graphical display data to be viewed on a display device, said method comprising:

writing a linked command list which manipulates the graphical display data into a first portion of a memory with a first processing unit, said linked command list having a plurality of linked graphical commands with each of said linked graphical commands including a set of command parameters;

instructing a second processing unit to implement said linked command list with said first processing unit;

initiating the implementation of said linked command list with said second processing unit;

reading and implementing said linked graphical commands with said second processing unit without interrupting said first processing unit to process the graphical display data;

suspending the implementation of one of said linked graphical commands until an occurrence of a trigger event upon reading a mode parameter within said one linked graphical command to provide flow control of said linked command list; and displaying the graphical display data processed under said linked command list on the display device using said flow control to substantially eliminate display anomalies.

2. The method as defined in claim 1 further comprising implementing at least two bit block transfer commands before alerting said first processing unit of a completion of one of said bit block transfer commands.

3. The method as defined in claim 1 further comprising implementing at least two video capture commands before alerting said first processing unit of a completion of one of said video capture commands.

4. The method as defined in claim 1 further comprising implementing at least two video display commands before alerting said first processing unit of a completion of one of said video display commands.

5. The method as defined in claim 1 further comprising notifying said first processing unit upon completion of all of said linked graphical commands in said linked command list.

6. The method as defined in claim 1 further comprising implementing a previously implemented linked graphical command from the linked command list and continuing through said linked command list.

7. The method as defined in claim 1 further comprising suspending the implementation of said linked command list upon said second processing unit forwarding an interrupt to said first processing unit.

8. The method as defined in claim 1 wherein said display anomalies include improper animation timing, improper lip synch timing and display tearing.

9. The method as defined in claim 1 wherein said trigger event includes waiting for a specific portion of a display field.

10. The method as defined in claim 1 further comprising suspending the implementation of one of said linked graphical commands until one refresh of the display device.

11. The method as defined in claim 1 further comprising replacing at least one linked graphical command with another linked graphical command such that upon implementing each linked graphical command, said another linked graphical command is implemented in place of said at least one linked graphical command.

12. The method as defined in claim 1 further comprising pointing to another portion of said memory which includes at least one pixel map.

13. The method as defined in claim 12 further comprising modifying said at least one pixel map.

14. A system for processing graphical display data to be viewed on a display device, said system comprising:

a memory operable to store a linked command list which manipulates the graphical display data, said linked command list having a plurality of linked graphical commands with each of said linked graphical commands including a set of command parameters;

a first processing unit operable to write said linked command list into said memory; and a second processing unit in communication with said memory and said first processing unit, said second processing unit operable to read each linked graphical command from said memory and operable to implement said linked graphical commands without interrupting said first processing unit, said second processing unit further operable to suspend implementation of one of said linked graphical commands until an occurrence of a trigger event upon reading a mode parameter within said one linked graphical command to provide flow control of said linked command list, whereby upon displaying the graphical display data processed under said linked command list on the display device, display anomalies are substantially eliminated.

15. The system as defined in claim 14 wherein said second processing unit is an application specific integrated circuit (ASIC).

16. The system as defined in claim 14 wherein said second processing unit notifies said first processing unit upon completion of all of said linked graphical commands in said linked command list.

17. The system as defined in claim 14 wherein each of said linked graphical commands includes a first field which directs the operational mode of said second processing unit, a second field which points to another location in said memory containing a pixel map, and a third field which points to the next linked graphical command in said linked command list.

18. The system as defined in claim 14 wherein one of said graphical commands checks a source pixel for transparency and conditionally replaces a destination pixel if the source pixel is not transparent.

19. The system as defined in claim 14 wherein one of said graphical commands blends two pixel arrays on a pixel-by-pixel basis according to a blending factor and writes a resulting pixel array to a destination address.

20. The system as defined in claim 14 wherein said linked command list when implemented causes successive portions of a pixel map to be mapped onto the display, creating a panning effect.

21. The system as defined in claim 14 wherein said display anomalies include improper animation timing, improper lip synch timing and display tearing.

22. The system as defined in claim 14 wherein said trigger event includes waiting for a specific portion of a display field.

* * * * *